(12) United States Patent
Hasegawa et al.

(10) Patent No.: US 7,106,667 B2
(45) Date of Patent: Sep. 12, 2006

(54) DATA RECORDING DEVICE CAPABLE OF RESTARTING AFTER AN INTERRUPTION

(75) Inventors: Yuka Hasegawa, Kyoto (JP); Yasuhisa Mashiko, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 538 days.

(21) Appl. No.: 10/214,302

(22) Filed: Aug. 8, 2002

(65) Prior Publication Data
US 2003/0072229 A1 Apr. 17, 2003

(30) Foreign Application Priority Data
Aug. 10, 2001 (JP) .............................. 2001-244048

(51) Int. Cl.
*G11B 21/08* (2006.01)
(52) U.S. Cl. ................................. 369/30.24; 369/30.23
(58) Field of Classification Search ............ 369/30.24, 369/30.23, 30.36, 30.05, 30.19, 30.21, 30.22, 369/47.32, 47.33, 47.34, 53.12, 53.18, 53.35, 369/53.36, 53.42
See application file for complete search history.

(56) References Cited

U.S. PATENT DOCUMENTS

| | | | |
|---|---|---|---|
| 5,926,605 A * | 7/1999 | Ichimura | 386/69 |
| 6,198,707 B1* | 3/2001 | Yamamoto | 369/47.25 |
| 6,212,138 B1* | 4/2001 | Kalis et al. | 369/30.06 |
| 6,266,308 B1* | 7/2001 | Andoh | 369/53.24 |
| 6,356,520 B1* | 3/2002 | Hanamoto et al. | 369/47.1 |
| 6,438,083 B1* | 8/2002 | Kroon | 369/30.24 |
| 6,496,458 B1* | 12/2002 | Tsukihashi | 369/47.47 |
| 6,560,180 B1* | 5/2003 | Tsukihashi et al. | 369/53.31 |
| 6,587,416 B1* | 7/2003 | Tsukihashi | 369/59.14 |
| 6,631,101 B1* | 10/2003 | Chan et al. | 369/30.36 |
| 6,775,214 B1* | 8/2004 | Suzuki | 369/47.51 |
| 6,791,922 B1* | 9/2004 | Suzuki | 369/47.3 |
| 6,795,385 B1* | 9/2004 | Nishimura et al. | 369/47.33 |
| 2001/0006496 A1* | 7/2001 | Hayashi et al. | 369/47.32 |
| 2001/0006499 A1* | 7/2001 | Hayashi et al. | 369/47.34 |
| 2002/0186630 A1* | 12/2002 | Komaki | 369/47.33 |

FOREIGN PATENT DOCUMENTS

| | | |
|---|---|---|
| JP | 10-49990 | 2/1998 |
| JP | 2000-40302 | 2/2000 |

* cited by examiner

*Primary Examiner*—Tan Dinh
(74) *Attorney, Agent, or Firm*—McDermott Will & Emery LLP

(57) ABSTRACT

When data recording is interrupted, a location at which data have been last recorded is accurately detected and a seamless restart of the recording is achieved even if reproducing errors occur due to scratches or the like on an optical disk. A pattern data that indicates a pit pattern of data to be recorded or having been recorded is compared to a pattern data that is reproduced within a predetermined range (window) of clock cycles, and when a match is obtained, a recording restart signal is output to restart the recording operation.

11 Claims, 12 Drawing Sheets

DATA RECORDING DEVICE CAPABLE OF RESTARTING AFTER AN INTERRUPTION

BACKGROUND OF THE INVENTION

The present invention relates to data recording devices for recording and reproducing data on optical disks such as CD-R (Compact Disc Recordable) or CD-RW (Compact Disc Rewritable).

When recording data in optical disks such as CD-Rs and CD-RWs, an entire track or optical disk needs to be completed with one recording operation, as implied by the names of methods for writing disks, such as Disk-at-once and Track-at-once. Thus, if a data recording fails, the whole optical disk becomes unusable or the previously recorded data are lost. The recording failure can be caused by, for example, a buffer underrun error. The buffer underrun error occurs because the buffer, in which recording data are temporarily stored, is emptied when the data transfer speed of the recording data transferred from the host is slower than the data recording speed of the optical disk device and consequently a recording operation cannot be continued.

In view of this problem, Japanese Unexamined Patent Publication Nos. 10-49990 and 2000-40302 disclose an apparatus that can temporarily suspend recording operation when the recording failure is expected to occur and can restart afterwards. This apparatus has a configuration as follows. When the recording data held in the buffer reduces while the recording operation is being underway, that is, when a buffer underrun error is likely to occur, the recording operation is interrupted, and the internal information at that point is held, specifically, such as the data to be recorded next (more specifically, the pattern data indicating a pit pattern to be actually recorded and the data which are necessary to generate the pattern data) and the information indicating that the recording should be restarted at what clock of which frame. When a predetermined amount of data has been accumulated in the buffer, and after a subcode sync is detected, the recording location for the next data is detected by counting the PLL (Phase Locked Loop) clock of the channel bit, and then the recording is restarted.

However, the above-described device, which detects a recording location by counting the PLL clock, has at least the following problem. When the data that are up to the recording interruption can be properly reproduced, the above-described device can restart recording at comparatively high accuracy so that continuous data can be recorded with few or no seams (overlaps and gaps). However, when errors are caused when reproducing the recorded data, for example, when the optical disk is damaged by a scratch or when the pit pattern is unstable during the recording due to external vibration or the like, the device cannot restart from an appropriate recording location. Optical disks are susceptible to damage, and they often cause recording and/or reproducing errors due to scratches or the like. During a normal reproducing operation, such errors are in many cases recoverable and the data reproducing can be properly performed with the use of a predetermined error correction process. In cases where the interrupted recording is to be restarted, however, if the synchronization of PLL is disrupted and the phase of the PLL clock is shifted at a location where a reproducing error occurs, the location at which the data have been last recorded before the interruption of the recording cannot be accurately detected, and as a result, the location of restart of the recording is displaced. Consequently, a seamless and continuous recording cannot be attained.

SUMMARY OF THE INVENTION

In view of the foregoing and other problems in the prior art, it is an object of the present invention to make it possible to restart the recording with no or few seams by detecting the location at which data are last recorded even if a reproducing error occurs due to scratches or the like on the optical disk when data recording is interrupted.

This and other objects are accomplished in accordance a first aspect of the present invention by providing a controller for a data recording device wherein, if recording to a recording medium is temporarily interrupted, then the recording is restarted in continuation of the end of recorded data that have been recorded prior to the interruption of the recording, comprising: a data match-detecting means for detecting a match between at least part of pre-recorded data that are used for the recording prior to the interruption of the recording and reproduced data that are reproduced subsequent to the interruption of the recording; and an end-of-data-detecting means for detecting the end of the recorded data according to the detection of the match carried out by the data match-detecting means within the range of a predetermined number of clock cycles counted from a predetermined reference location in the reproduced data.

In this configuration, the end of the recorded data is detected by detecting a match between the pre-recorded data and the reproduced data. As a consequence, even if a clock phase shift occurs due to damages or the like to the recording medium when reproducing the recorded data, the end of the recorded data can be accurately detected and the recording can be restarted. Moreover, the detection of the end of the recorded data is performed according to the detection of a match between the pre-recorded data and the reproduced data within the range of a predetermined number of clock cycles counted from a predetermined reference location in the reproduced data, and therefore, for example by setting the range of the predetermined number of clock cycles to be the number of clock cycles corresponding to the end of the recording or an adjacent number of clock cycles before and after the end of the recording, it is possible to easily prevent erroneous detection that is caused by a match between a portion of the pre-recorded data and a portion of the reproduced data other than the end portion.

In the above-described controller for a data recording device, the data match-detecting means compares data having a predetermined number of bits of the pre-recording data that are before the end of the pre-recording data with data having the same number of bits of the reproduced data, and the data match-detecting means determines that a match between the data has been detected if the number of matching bits is equal to or greater than a predetermined threshold value.

In this manner, by determining that a match has been obtained even if the pre-recorded data and the reproduced data do not completely match but the number of matching bits is equal to or greater than a predetermined threshold value, the end of recorded data can be detected relatively accurately and the recording can be restarted in cases, for example, where the compared data contain bit errors.

In the above-described controller for a data recording device, it is preferable that the threshold value is variable.

With this configuration, the accuracy of detection of matching between the pre-recorded data and the reproduced data is made flexible, and consequently, it is possible to restart writing, for example, only in cases where there is a high possibility that proper data reproduction can be carried out, or to restart writing in cases there is a possibility, if any, that a proper data reproducing can be carried out.

In the above-described controller for a data recording device, it is preferable that the threshold value is set according to a quality of a reproduced signal when reproducing the reproduced data, and the quality of the reproduced signal is determined by, for example, the presence or absence of a synchronizing signal in the reproduction signal.

With this configuration, the end of the recorded data can be detected according to the quality of the reproduced signal, and therefore, the recording is restarted so that a more appropriate data reproduction can be performed.

In the above-described controller for a data recording device, it is preferable that the range of the predetermined number of clock cycles is variable.

With this configuration as well, the accuracy of detection of matching between the pre-recorded data and the reproduced data is made flexible, and consequently, it is possible to restart writing, for example, only in cases where there is a high possibility that proper data reproduction can be carried out, or to restart writing in cases there is a possibility, if any, that a proper data reproducing can be carried out.

In the above-described controller for a data recording device, it is preferable that the range of the predetermined number of clock cycles is set according to a quality of a reproduced signal when reproducing the reproduced data, and the quality of the reproduced signal is determined by, for example, the presence or absence of a synchronizing signal in the reproduction signal.

With this configuration as well, the end of the recorded data can be detected according to the quality of the reproduced signal, and therefore, the recording is restarted so that a more appropriate data reproduction can be performed.

The above-described controller for a data recording device may further comprise an interruption timing-controlling means for controlling timing of interrupting the recording from the time when a synchronization pattern has been recorded in the recording medium.

This configuration allows the device to interrupt the recording at the location immediately after a synchronization pattern, or to reduce the number of clock cycles from a synchronization pattern to the end of the recorded data. As a result, it is possible to avoid adverse effects caused by data reproduction errors due to damages to the recording medium between the synchronization pattern and the end of the recorded data so that the end of the recorded data can be accurately detected.

The above-described controller for a data recording device may further comprise a recording speed-controlling means for controlling a recording speed such that the recording is restarted at a recording speed that is slower than the speed of the recording before the interruption of the recording and the recording speed is thereafter returned to the speed of the recording before the interruption of the recording.

This configuration allows the device to reduce adverse effects caused by delays of circuit operations or the like so that the recording can be highly accurately restarted so as to continue with the end of the recorded data.

The present invention also provides, in accordance with another aspect of the invention, a controller for a data recording device wherein, if recording to a recording medium is temporarily interrupted, then the recording is restarted in continuation of the end of recorded data that have been recorded prior to the interruption of the recording, comprising: an interruption timing-controlling means for controlling timing of interrupting the recording from the time when a synchronization pattern has been recorded in the recording medium; and a recording restart timing-controlling means for controlling timing of restart of the recording so that the recording is restarted at the same timing as timing of interrupting the recording from the time when the synchronization pattern is reproduced.

This configuration also allows the device to interrupt the recording at the location immediately after a synchronization pattern, or to reduce the number of clock cycles from a synchronization pattern to the end of the recorded data. As a result, it is possible to avoid adverse effects caused by data reproduction errors due to damages to the recording medium between the synchronization pattern and the end of the recorded data so that the end of the recorded data can be accurately detected.

The present invention also provides, in accordance with another aspect of the invention, a controller for a data recording device wherein, if recording to a recording medium is temporarily interrupted, then the recording is restarted in continuation of the end of recorded data that have been recorded prior to the interruption of the recording, comprising: a recording speed-controlling means for controlling a recording speed such that the recording is restarted at a recording speed that is slower than the speed of the recording before the interruption of the recording and the recording speed is thereafter returned to the speed of the recording before the interruption of the recording.

This configuration also allows the device to reduce adverse effects caused by delays of circuit operations or the like so that the recording can be highly accurately restarted so as to continue with the end of the recorded data.

The present invention also provides, in accordance with another aspect of the invention, a data recording device wherein, if recording to a recording medium is temporarily interrupted, then the recording is restarted in continuation of the end of recorded data that have been recorded prior to the interruption of the recording, comprising: a recording data-generating means for generating recording data; a recording means for recording the generated data in the recording medium; a data match-detecting means for detecting a match between at least part of pre-recorded data that are used for the recording prior to the interruption of the recording and reproduced data that are reproduced subsequent to the interruption of the recording; an end-of-data-detecting means for detecting the end of the recorded data according to the detection of the match carried out by the data match-detecting means within the range of a predetermined number of clock cycles counted from a predetermined reference location in the reproduced data; and a recording restart-controlling means for restarting data recording by operating the recording data-generating means and the recording means when the end of the recorded data is detected by the end-of-data-detecting means.

In this configuration, the end of the recorded data is detected by detecting a match between the pre-recorded data and the reproduced data. As a result, it is possible to obtain a data recording device that can accurately detect the end of the recorded data and can restart the recording even if a clock phase shift occurs due to damages or the like to the recording medium when reproducing the recorded data.

The present invention also provides, in accordance with another aspect of the invention, a data recording device wherein, if recording to a recording medium is temporarily interrupted, then the recording is restarted in continuation of the end of recorded data that have been recorded prior to the interruption of the recording, comprising: a recording data-generating means for generating recording data; a recording means for recording the generated data in the recording medium; an interruption timing-controlling means for controlling timing of interrupting the recording from the time when a synchronization pattern has been recorded in the recording medium; and a recording restart timing-controlling means for controlling timing of restart of the recording so that the recording is restarted at the same timing as timing of interrupting the recording from the time when the synchronization pattern is reproduced; wherein the interruption timing-controlling means and the recording restart timing-controlling means are configured to interrupt or restart data recording by stopping or starting the recording data-generating means and the recording means.

This configuration allows the device to interrupt the recording at the location immediately after a synchronization pattern, or to reduce the number of clock cycles from a synchronization pattern to the end of the recorded data. As a consequence, it is possible to obtain a data recording device that can avoid adverse effects caused by reproducing errors due to damages to the recording medium between the synchronization pattern and the end of the recorded data so that the end of the recorded data can be accurately detected easily.

The present invention also provides, in accordance with another aspect of the invention, a data recording device wherein, if recording to a recording medium is temporarily interrupted, then the recording is restarted in continuation of the end of recorded data that have been recorded prior to the interruption of the recording, comprising: a recording data-generating means for generating recording data; a recording means for recording the generated data in the recording medium; and a recording speed-controlling means for controlling a recording speed such that the recording is restarted at a recording speed that is slower than the speed of the recording before the interruption of the recording and the recording speed is thereafter returned to the speed of the recording before the interruption of the recording; wherein the recording speed-controlling means is configured to control the recording speed by controlling operation speeds of the recoding data-generating means and the recording means.

This configuration makes it possible to obtain a data recording device that can reduce adverse effects caused by delays of circuit operations or the like, so that the recording can be highly accurately restarted so as to continue with the end of the recorded data.

DETAILED DESCRIPTION OF THE INVENTION

Figure 1:
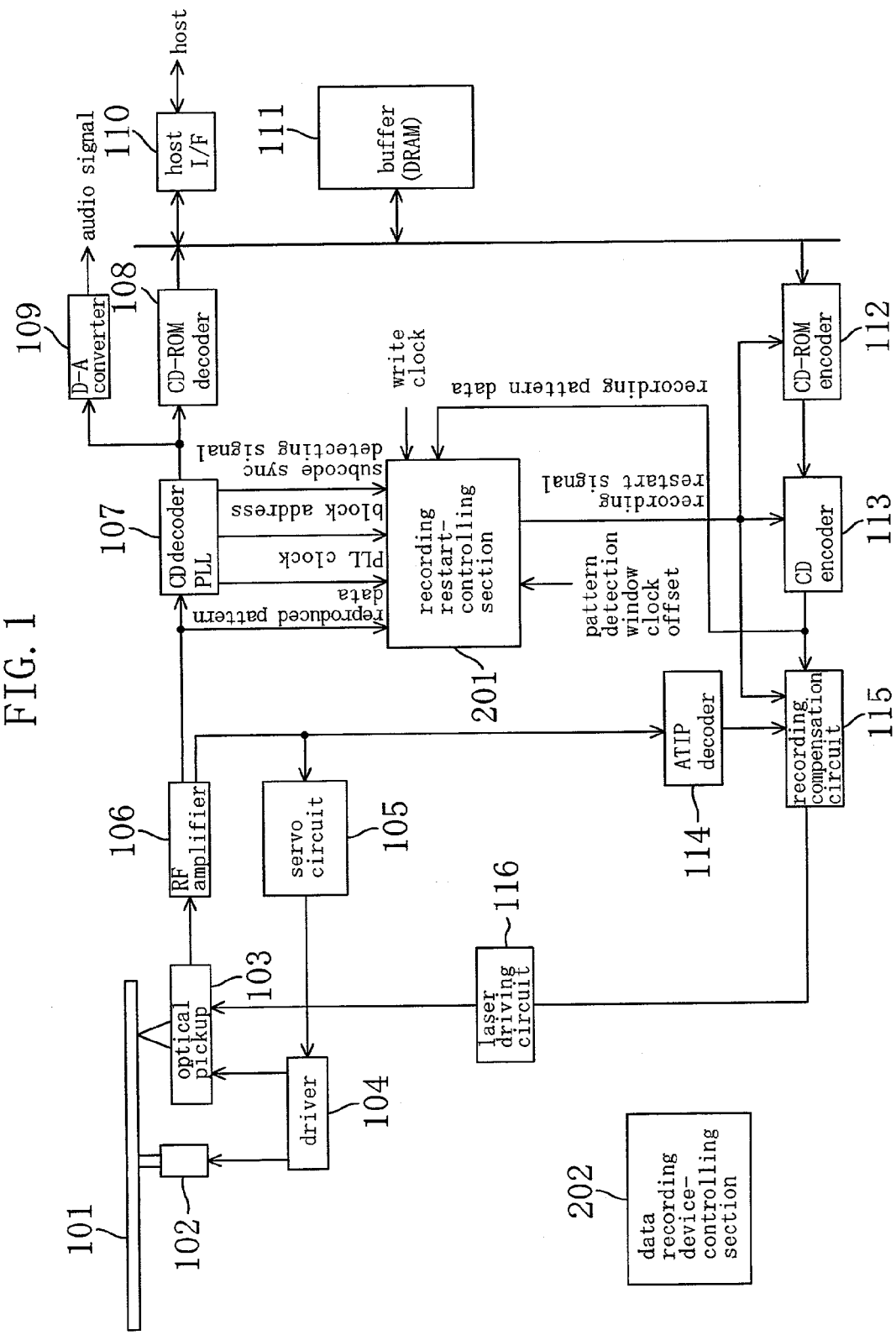
FIG. 1 is a block diagram showing the entire configuration of a data recording device according to Embodiment 1 of the invention.

Referring to the drawings and taking a CD-R recording device as an example, preferred embodiments of the present invention are detailed below.

EMBODIMENT 1

FIG. 1 is a block diagram showing the entire configuration of a data recording device according to Embodiment 1 of the present invention. This data recording device comprises:

a spindle motor 102 that rotationally drives an optical disk 101;

an optical pickup 103 that performs data recording and reproducing for the optical disk 101 by irradiating with laser light and receiving the reflected light;

a driver 104 that drives the spindle motor 102 and the optical pickup 103;

a servo circuit 105 that controls the rotation speed of the spindle motor 102 and the focusing and tracking of the optical pickup 103;

an RF amplifier 106 that outputs an amplified RF signal, which is an amplified signal of the RF signal that is output from the optical pickup 103, and a digital signal corresponding to a channel bit, which is created by binarizing the amplified RF signal;

a CD decoder 107 and CD-ROM decoder 108 that generates a PLL clock and performs de-interleaving and error correction handling;

a D-A converter 109 that converts a digital signal that is output from the CD decoder 107 into an analog audio signal when music data are reproduced;

a host interface 110 that transfers recording data and reproduced data between the device and a personal computer or the like that serves as a host;

a buffer 111 that temporarily stores the recording data and the reproduced data;

a CD-ROM encoder 112 and a CD encoder 113 that modulates the recording data stored in the buffer 111 by performing addition of error correction codes and interleaving, to generate pattern data indicating the pit pattern that is to be actually recorded in the optical disk 101;

an ATIP decoder 114 that extracts a wobble signal from the amplified RF signal that is output from the RF amplifier 106 and demodulates ATIP (Absolute Time In Pre-Groove) that indicates absolute time information;

a recording-compensating circuit 115 that generates a recording waveform suitable for the recording medium according to the pattern data that is output from the CD encoder 113;

a laser driving circuit 116 that generates a laser driving current for the optical pickup 103 with the output from the recording-compensating circuit 115;

a recording restart-control section 201 that controls the restart of the recording after the recording has been interrupted due to a buffer under-run error or the like; and a data recording device-controlling section 202 that control the operation of the entire data recording device, more specifically, for example, setting of a block address to block address register 214a and setting of numbers of clock cycles to counters 214c and 214d or the like of the recording restart-controlling section 201, which will be detailed later.

Figure 2:
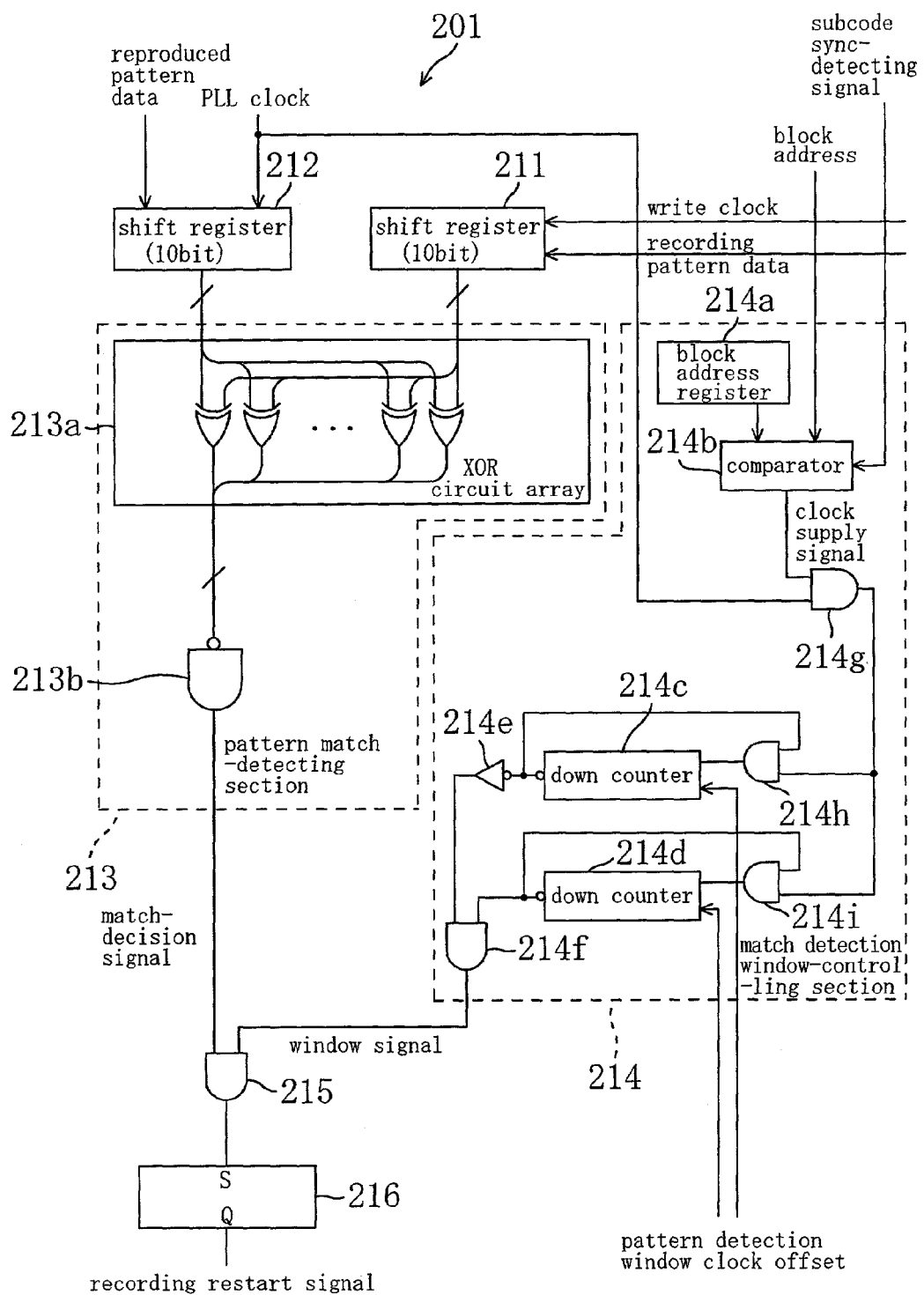
FIG. 2 is a circuit diagram showing the configuration of a recording restart-controlling section 201 in detail.

As shown in FIG. 2, the recording restart-controlling section 201 has, for example:

a shift register 211 with, for example, 10-bit width that sequentially shifts and holds a pattern data (comparison pattern data) indicating a pit pattern of the data to be recorded (or the data that have been recorded);

a shift register 212 with, for example, 10-bit width that sequentially shifts and holds the pattern data to be reproduced (reproduced pattern data);

a pattern match-detecting section 213 that detects a match between the comparison pattern data and the reproduced pattern data held in the shift registers 211 and 212;

a match detection window-controlling section 214 that controls the range (window) in which the match between the pattern data is to be detected;

an AND circuit 215; and a flip-flop 216.

The pattern match-detecting section 213 has an XOR circuit array 213a in which each bit that is output from the shift registers 211 and 212 is XORed, and an AND circuit 213b that outputs an H (high) level signal when all the output bits from the XOR circuit array 213a are at an L (low) level.

The match detection window-controlling section 214 has a block address register 214a, a comparator 214b, a detection start counter 214c, a detection end counter 214d, an inverter 214e, and AND circuits 214f to 214i. The block address register 214a holds an address of the block (sector) that is one before the block at which the recording is interrupted (that immediately precedes the block at which the recording is interrupted). The comparator 214b compares the block address detected by the CD decoder 107 when recorded data are reproduced prior to the restart of the recording with the block address that has been held in the block address register 214a, and it outputs a clock supply signal at an H level when the subcode sync of the next block, which is the last recorded block (the block at which the recording has been interrupted), is detected after the compared block addresses have matched. The detection start counter 214c and the detection end counter 214d count the number of clocks (the number of channel bits) from the start of the H-level clock supply signal output until the pattern data match detection is started or ended.

Next, the operation of the data recording device thus configured is detailed below.

Recording Operation

The operation itself for recording data onto the optical disk 101 is carried out in a similar manner to that in conventional data recording devices. Specifically, recording data that are transferred from the host via the interface 110 are temporarily stored in the buffer 111 and are thereafter subject to the addition of error correction codes and interleaving with the CD-ROM encoder 112 and the CD encoder 113, to generate pattern data indicating the pit pattern that is actually to be recorded. Then, the generated pattern data is recorded when it is detected that the optical pickup 103 has reached a location at which the recording is to be started in the optical disk 101 based on the ATIP that is demodulated by the ATIP decoder 114.

In the data recording device according to the present embodiment, the pattern data are input into the shift register 211 and sequentially shifted in synchronous with write clocks to be held therein. Here, when recording is to be interrupted due to a buffer underrun error or the like, the write clocks are stopped to hold the last 10 bits of the comparison pattern data recorded in the optical disk 101 in the shift register 211.

Figure 3:
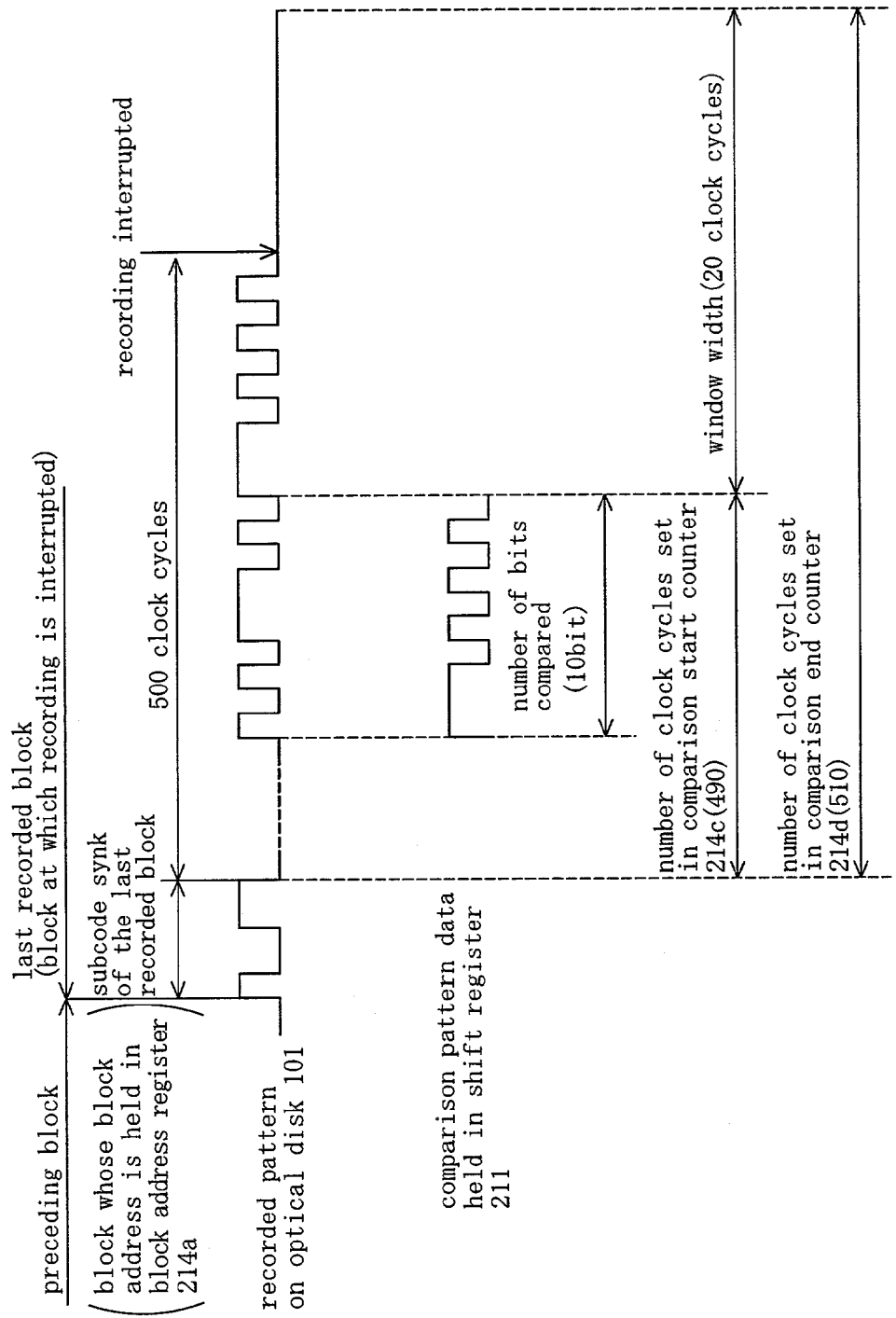
FIG. 3 is shows an example of a recording pattern in an optical disk 101 and a comparison pattern data.

In the case where recording is interrupted as described above, an address that is obtained by decrementing the address of the last recorded block (an address of the block that is one before the block at which the recording is interrupted) is held in the block address register 214a of the match detection window-controlling section 214, and at the same time, the number of clock cycles from the location at which the subcode sync of the last recorded block is recorded to the location at which the match detection of pattern data is started or ended when recording is restarted is set in the detection start counter 214c and the detection end counter 214d. More specifically, as shown in FIG. 3, in the case where the number of bits of the comparison pattern data is 10 bits, the comparison window width is 20 bits, and the number of write clock cycles from the subcode sync of the last recorded block to the interruption of the recording is 500 clock cycles, the detection start counter 214c is set at "490", and the detection end counter 214d is set at "510" (500±20/2). More precisely, in cases where the window overlaps across two blocks, the address of the block that is one more block before is held by the block address register 214a, and a number of clock cycles that is obtained with reference to the subcode sync of the next block (that is, the block that is one block before the block at which the recording is interrupted) is set in the counters 214c and 214d.

Recording Restart Operation

When the cause of interruption of the recording is removed and the recording is restarted, the location in the optical disk 101 at which the recording has been interrupted is detected first. Specifically, as an operation similar to the normal reproducing operation is being performed, reproduced pattern data that are reproduced corresponding to the recorded pit pattern are shifted bit by bit in synchronous with the PLL clock output from the CD decoder 107 and are held in the shift register 212 of the recording restart-controlling section 201.

The reproduced pattern data held in the shift register 212 is compared to the comparison pattern data held in the shift register 211 by the XOR circuit array 213a. Specifically, 10 bits of the reproduced pattern data that have been reproduced most recently are compared bit by bit to the last 10 bits of the comparison pattern data that have been recorded in the optical disk 101 immediately before the interruption of the recording, and if all the bits match, the AND circuit 213b outputs a match decision signal which is at an H level.

Figure 4:
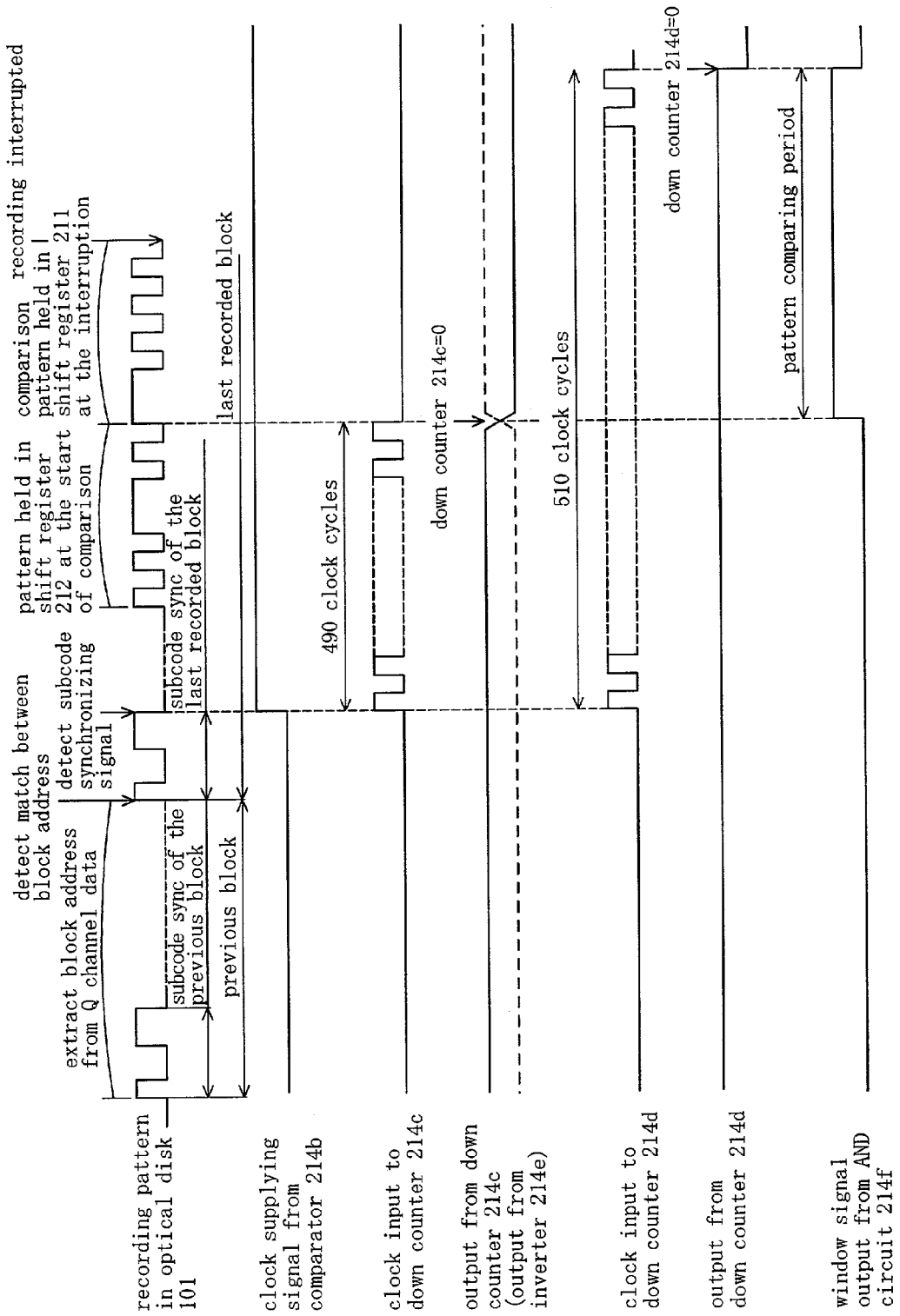
FIG. 4 is a timing chart showing operations or the like of various sections in the recording restart-controlling section 201.

Meanwhile, as shown in FIG. 4, the comparator 214b in the match detection window-controlling section 214 of the recording restart-controlling section 201 compares the block address output from the CD decoder 107 with the block address held in the block address register 214a based on the Q channel data of the subcode in the reproduced pattern data. Then, if, after the block addresses match, the CD decoder 107 outputs a signal indicating the detection of subcode sync, in other words, if the subcode sync of the last block that was recorded before the interruption of the recording is detected, the comparator 214b outputs a clock supply signal, which is at an H level, to input the PLL clock to the counters 214c and 214d. The counters 214c and 214d decrement the held values according to the PLL clock, and the AND circuit 213f outputs a window signal at an H level from the time when the value held in the detection start counter 214c becomes 0 until the value held in the detection end counter 214d becomes 0.

Then, the match decision signal output from pattern match-detecting section 213 turns to an H level while the window signal output from the match detection window-controlling section 214 is at an H level, the recording restart signal that is output from the flip-flop 216 holds at an H level so that the recording is restarted to record a pit pattern that follows the pit pattern that has been recorded before the interruption.

Figure 5:
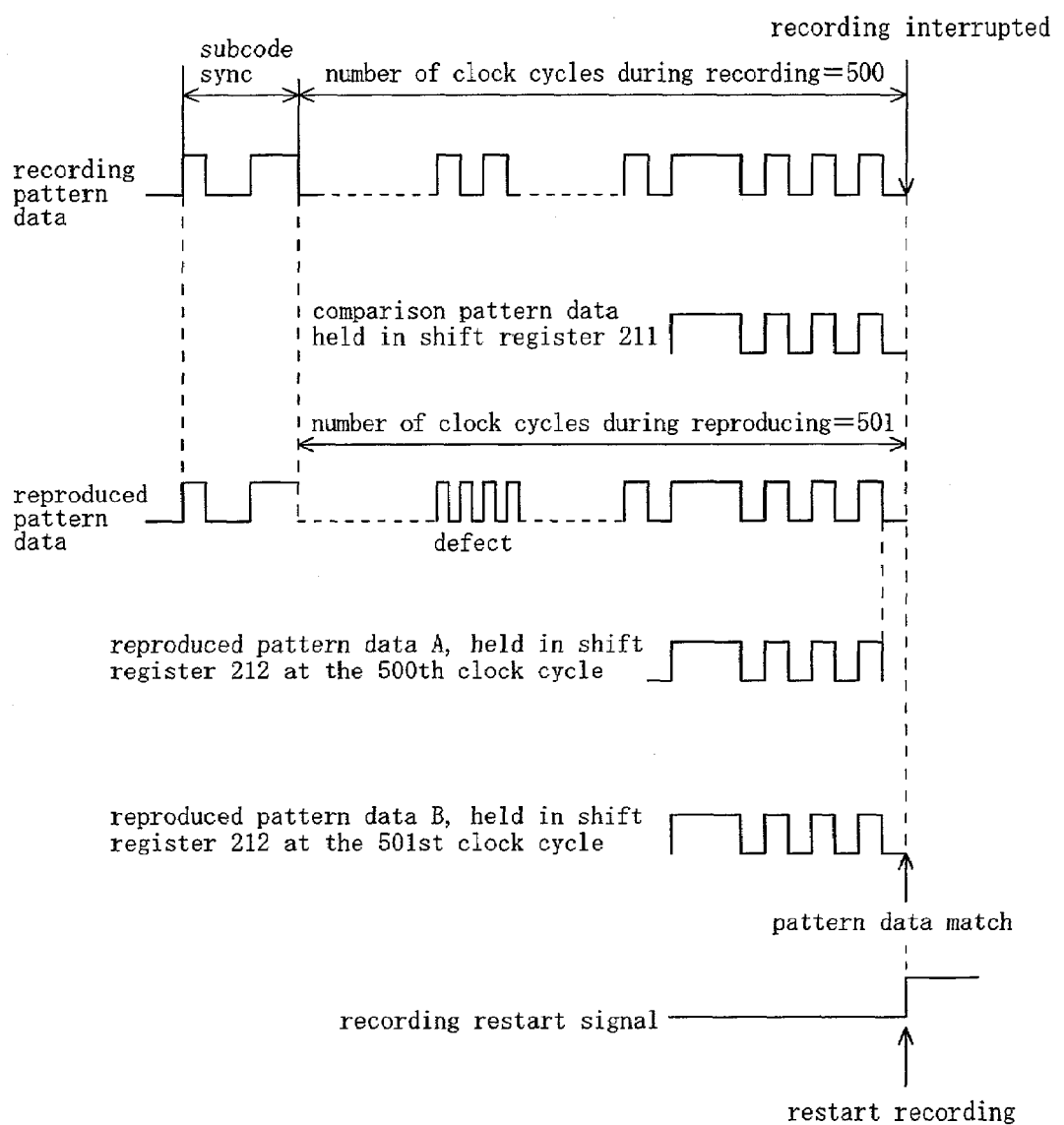
FIG. 5 is a timing chart showing the operations in cases where reproduced data have errors.

Here, for example as shown in FIG. 5, assume that when the recording is interrupted at the location of the 500th clock cycle from the subcode sync, the phase of PLL clock is shifted during the reproducing because of scratches or the like on the optical disk 101 and consequently the number of clock cycles from the subcode sync to the interrupted location thus becomes 501. In this case, at the time when the number of clock cycles from the subcode sync has reached 500, the reproduced pattern data A held in the shift register 212 does not match the comparison pattern data held in the shift register 211. As a consequence, the match decision signal that is output from the AND circuit 213b (accordingly the recording restart signal that is output from the flip-flop 216) does not turn to an H level, and the restart of the recording does not occur. However, pattern data B held in the shift register 212 at the next clock, the 501st clock, matches the comparison pattern data. Thus, the match decision signal and the recording restart signal turn to an H level, bringing the CD-ROM encoder 112, the CD encoder 113, the laser driving circuit 116, and so forth into an operating state, and the recording is restarted so as to be accurately connected to the pit pattern that has already been recorded.

Nevertheless, even if the reproduced pattern data held in the shift register 212 matches the comparison pattern data held in the shift register 211, the recording is not restarted because the window signal that is output from the match detection window-controlling section 214 is at an L level when the number of clock cycles from the subcode sync is equal to or less than 489, or equal to or greater than 511, as shown in FIG. 4. In other words, it is conceivable that, even if a match is obtained between those pattern data, a large deviation of the number of clock cycles indicates that the pattern has matched with a pit pattern at a completely different location merely by accident or that the phase shift of the PLL clock phase is large due to, for example, the damage to the already-recorded portion. If this is a case, it is highly probable that a proper data reproduction will not be performed. In view of this problem, the recording is restarted only when a match between the pattern data match has been obtained within a predetermined window range, and thus, the restart of writing from an incorrect location or the like is prevented.

It should be noted that it is only necessary that the window width be appropriately set according to such factors as the recording characteristics of the device and the optical disk, the quality of the optical disk, the performance required for the device, and the like. For example, the window width may be 1 clock cycle so that the restart of writing is performed only when the pattern data match at the location with the same number of clock cycles as that when the recording was interrupted, that is, only when it is most probable that a proper data reproducing can be carried out. Alternatively, the window width may be set wide so that the restart of writing is performed when there is a possibility, if any, that the recorded data can be reproduced.

In addition, the following configurations are also possible. The device first attempts to restart writing with a narrow window width, but if the restart of writing is not possible, then the window width is set wider so that the restart of writing is again attempted. In another configuration, the device detects a location at which a match between the pattern data is obtained at least near the location of the interruption of the recording, and if the matching location is within a predetermined window width, the writing is restarted. In further another configuration, if more than one locations at which a match has been obtained are detected, the recording is restarted from the location at which the deviation of the number of clock cycles is the smallest.

EMBODIMENT 2

If the pattern data of the last recorded portion that was recorded before the interruption of the recording contain an error, the reproduced pattern data and the comparison pattern data do not exactly match. Embodiment 2 describes an example of a data recording device that is capable of restarting recording even in such cases. It should be noted that in the following embodiments, similar components and elements to those described in Embodiment 1 are designated by the same reference characters, and will not be further elaborated on.

Figure 6:
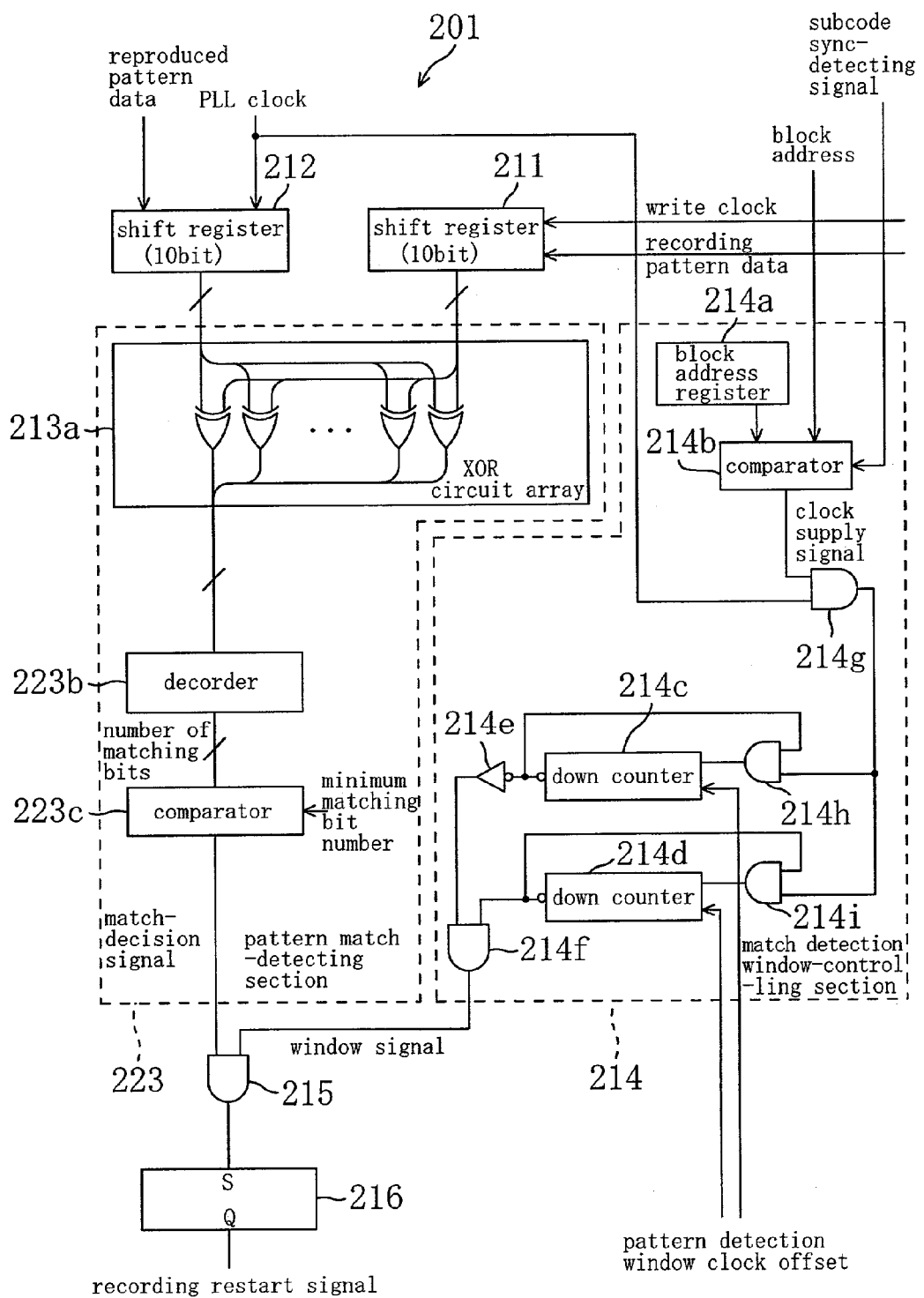
FIG. 6 is a circuit diagram showing the configuration of a recording restart-controlling section 201 according to Embodiment 2 of the present invention.

A data recording device according to Embodiment 2 mainly differs from the device of Embodiment 1 in that a pattern match-detecting section 223 as shown in FIG. 6 is provided in place of the pattern match-detecting section 213 of the recording restart-controlling section 201. The pattern match-detecting section 223 has the XOR circuit array 213a, which is identical to that of Embodiment 1. The pattern match-detecting section 223 also has a matching bit number-counting section 223b and a comparator 223c. The matching bit number-counting section 223b counts and then outputs the number of bits that are at an L level among the outputs for respective bits from the XOR circuit array 213a. The comparator 223c decides if the number of bits that are at an L level is equal to or greater than a predetermined minimum number of bits. Specifically, the matching bit number-counting section 223b comprises, for example, a decoder that outputs a number of bits that are at an L level according to input bit patterns, or a multiple input adder. The minimum matching bit number is given to the comparator 223c, for example, by the data recording device-controlling section 202 (see FIG. 1).

Figure 7:
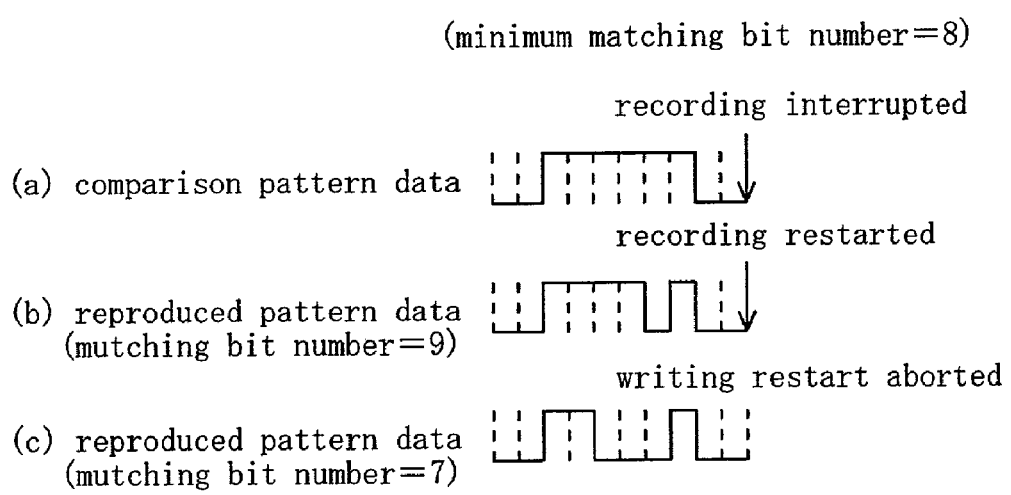
FIG. 7 shows an example of a comparison operation for pattern data.

Assume that, in the data recording device thus configured, the minimum matching bit number is set to be 8, for example, and the comparison pattern data that is held in the shift register 211 is data (a) shown in FIG. 7. In this case, when reproduced pattern data such as data (b) shown in FIG. 7 is reproduced, the number of matching bits is 9, so the comparator 223c outputs the match decision signal with H level, and thus, recording is restarted. In other words, even if there are a few bit errors, writing is reliably restarted when there is a high possibility that a detected location is the location at which recording is interrupted. (It should be noted that proper data can be read out because the bit errors themselves such as described above can be corrected by error correction with the CD-decoder 107 or the like, though it depends on the degree of errors.) On the other hand, when reproduced pattern data as shown by (c) in FIG. 7 is reproduced, the match decision signal output from the comparator 223c does not turn to an H level because the number of matching bits is 7, and consequently, (if, in the window, there is no other reproduced pattern data in which the number of matching bits is 8 or greater) restart of the recording is aborted. In other words, when the degree of matching is low between the pattern data, it is possible that the location at which the recording was interrupted cannot be found due to a large shift of the PLL clock, or that there was a serious physical damage at or near the location at which the recording was interrupted. If such is a case, it is highly probable that a proper data reproduction will not be performed, and therefore, restart of the writing is aborted.

It should be noted that the minimum number of matching bits is not limited to a fixed number. For example, the following is possible; the minimum number of matching bits is set large at first (for example, the minimum number of matching bits is restricted to a complete match) to attempt restart of writing, and when restart of writing fails, the minimum number of matching bits is set smaller to further attempt restart of writing. In addition, it is possible to detect a portion at which a match is obtained between the pattern data, and then to restart recording from a portion at which the number of matching bits is large or a portion at which the deviation of number of clock cycless is small.

EMBODIMENT 3

The present embodiment describes an embodiment of the data recording device in which the window width and the minimum matching bit number can be more appropriately set.

Figure 8:
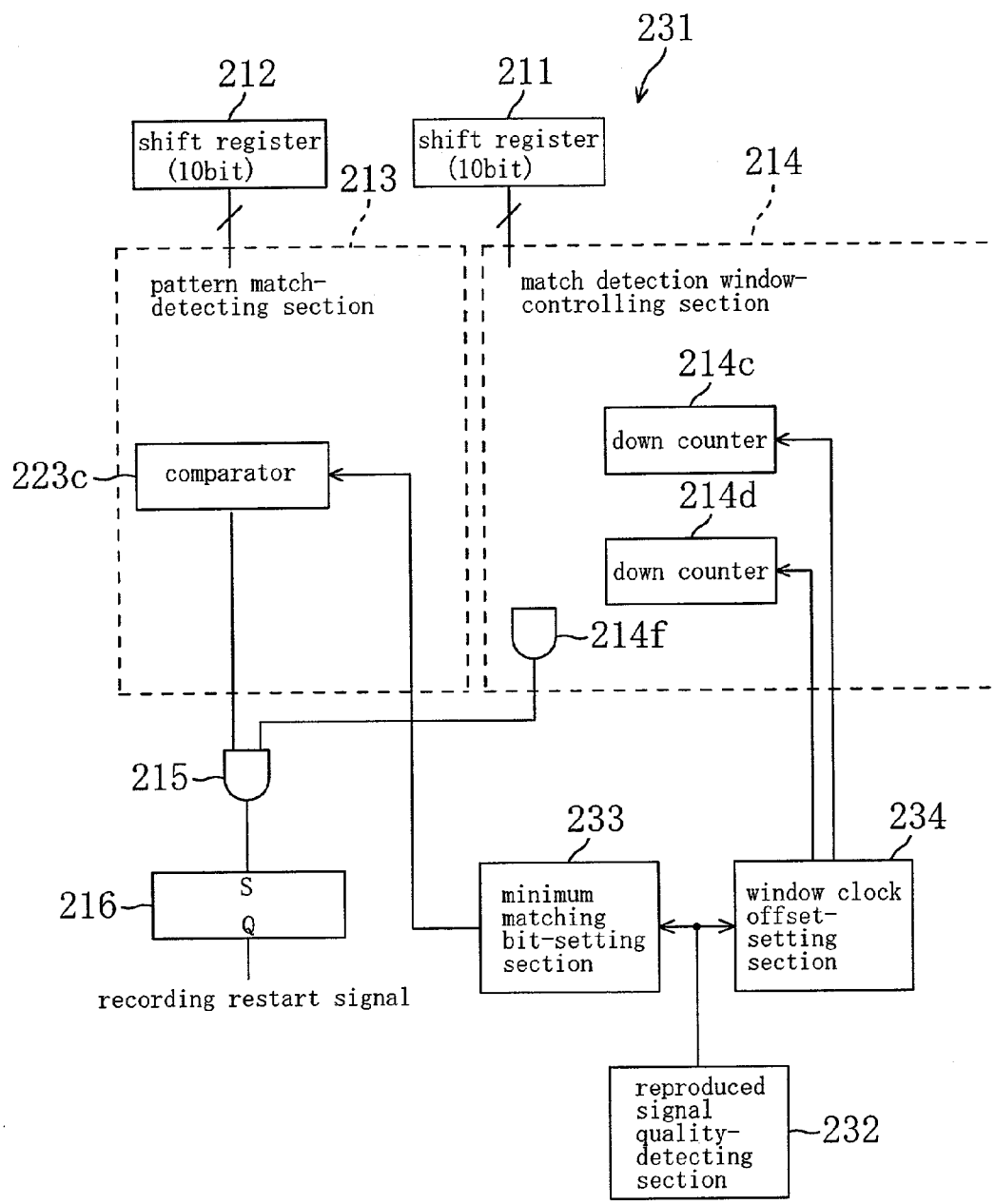
FIG. 8 is a circuit diagram showing the configuration of a pattern match-detecting section 213 of a data recording device according to Embodiment 3.

A data recording device according to Embodiment 3 has a recording restart-controlling section 231 shown in FIG. 8 in place of the recording restart-controlling section 201 of Embodiment 1. The recording restart-controlling section 231 has a reproduced signal quality-detecting section 232 that detects the quality of a reproduced signal, a minimum matching bit number-setting section 233, and a window clock offset-setting section 234, in addition to the configuration of the recording restart-controlling section 201 of Embodiment 1.

The reproduced signal quality-detecting section 232 detects, for example, the quality of a reproduced signal by detecting whether or not a loss of subcode sync is detected by the CD decoder 107 or the frequency thereof, whether or not error correction is performed by the CD decoder 107 or the frequency and degree thereof, a margin of RF signal level against the slice level when binarization is performed by the RF amplifier 106, or the combinations thereof.

The minimum matching bit number-setting section 233 determines a minimum matching bit number to be given to the comparator 223c based on the detected quality of the reproduced signal that is detected by the reproduced signal quality-detecting section 232. The window clock offset-setting section 234 determines a clock offset, in other words, a window width, that is set in the detection start counter 214c and the detection end counter 214d also based on the quality of a reproduced signal.

By setting the minimum matching bit number and window width according to the quality of reproduced signal as described above, it is possible to restart (or abort) recording according to the recording characteristics of the device and the optical disk, the quality of the optical disk, the performance required for the device, and so forth.

More specifically, for example, when subcode sync is dropped, error correction with the CD decoder 107 or the like can be performed by complementing subcode sync. However, in practice, when the location at which recording is interrupted is detected based on the number of clock cycles, the detection is performed with a number of clock cycles counted from the last detected subcode sync. In this case, the distance from the subcode sync to the location of interruption of the recording is long, and consequently, the possibility of errors to scratches or the like increases, which in turn increases the possibility of resulting in the phase shift of PLL clock. In view of this problem, the window width is set wide whereas the minimum matching bit number is set large, and thus, recording is accurately restarted from the location of interruption in a simple manner.

In addition, for example, in cases where the phase shift of PLL is relatively small even though the reproduced signal contains some bit errors, it is possible to restart recording from a location that is determined by prioritizing the number of clock cycles if the minimum matching bit number is set small and the window width is set narrow.

EMBODIMENT 4

The present embodiment describes another embodiment of the data recording device.

Figure 9:
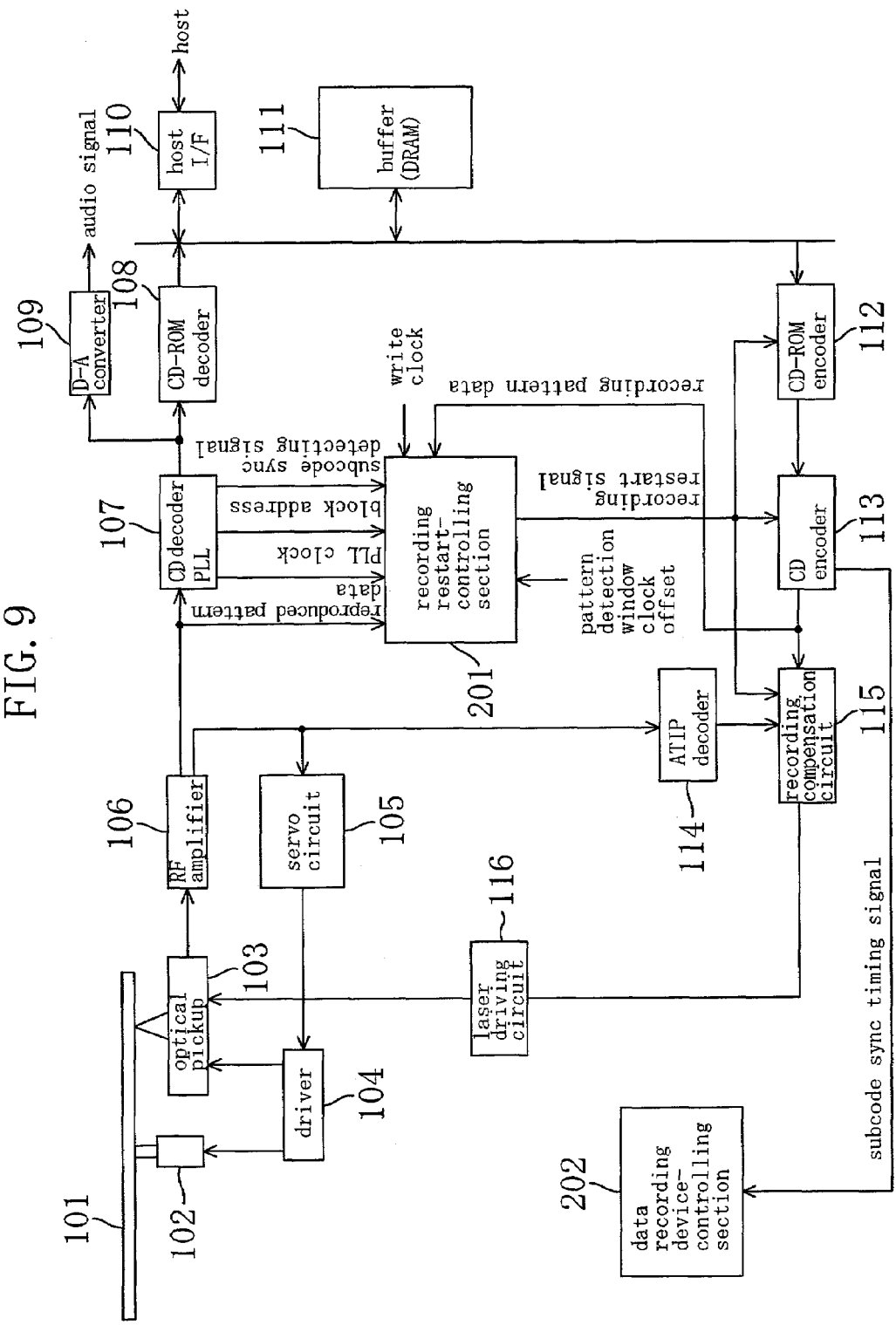
FIG. 9 is a block diagram showing the entire configuration of a data recording device according to Embodiment 4.

As shown in FIG. 9, a data recording device according to Embodiment 4 mainly differs from the data recording device of Embodiment 1 in that the CD encoder 113 outputs a subcode sync-recording timing signal when the CD encoder 113 outputs a pattern data for recording a subcode sync and that the data recording device-controlling section 202 interrupts the recording by stopping various portions thereof immediately after the subcode sync is recorded in response to the timing signal, or after a predetermined, relatively small number of clock cycles. By interrupting the recording at such timing, it is possible to eliminate, or significantly reduce, the distance from the subcode sync to the location of interruption of the recording. Accordingly, it is possible to reduce the possibility that the recording is restarted from an inaccurate location since the phase of the PLL clock is shifted due to scratches or the like on the optical disk 101, and thus, the restart of the recording can be easily made so as to be accurately continues from the pit pattern that has already been recorded.

In cases where the timing of interruption of the recording is controlled as described above, adverse effects caused by scratches or the like on the optical disk 101 can be suppressed without providing the recording restart-controlling section 201, which controls the location of restart of the recording by comparing pattern data. Nevertheless, if the recording restart-controlling section 201 is provided, a proper restart of the recording can be performed more reliably.

EMBODIMENT 5

The present embodiment describes further another embodiment of the data recording device.

Figure 10:
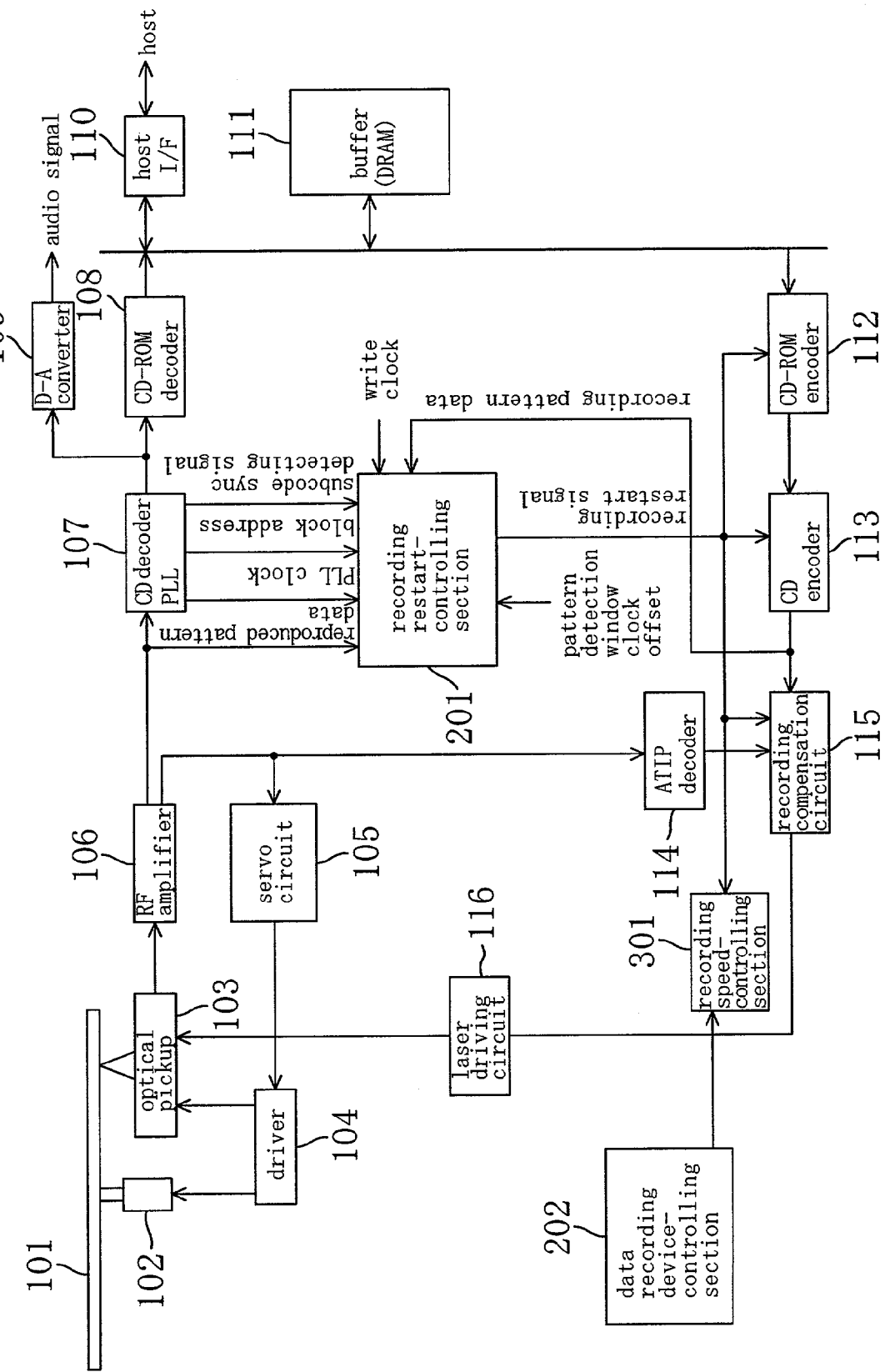
FIG. 10 is a block diagram showing the entire configuration of a data recording device according to Embodiment 5.

As shown in FIG. 10, a data recording device according to Embodiment 5 mainly differs from the data recording device in that the device has a recording speed-controlling section 301. At a restart of recording, the recording speed-controlling section 301 controls the operating speed of various portions in the device over a time period from the reproducing of the already-recorded data to a time immediately after the restart of recording so that the recording speed is made slower than the recording speed during a normal recording. More specifically, this control of operating speeds can be carried out by reducing the rotation speed of the spindle motor 102 by the driver 104 and by reducing, at the same time, operating clock frequencies of various portions. When a recording restart signal is output from the recording restart-control section 201 and the recording is restarted, the operating speed is gradually increased to return to the normal operating speed. By reducing the operating speed at the time of the restart of the recording in this manner, adverse effects caused by operation delays in various portions can be minimized and the location of restart of writing can be very accurately controlled. Moreover, it is possible to reduce or eliminate an adjustment operation for suppressing the operation delays, which would be required if the above-described speed control is not provided. It should be noted that these advantageous effects can be obtained even without the recording restart-controlling section 201.

The above-described embodiments describe the examples in which the bit length of the comparison pattern data is fixed to 10 bits. It should be noted, however, that the bit length, as well as the minimum matching bit number and the window width, may be set at various values according to the quality of reproduced signal or the like.

Figure 11A:
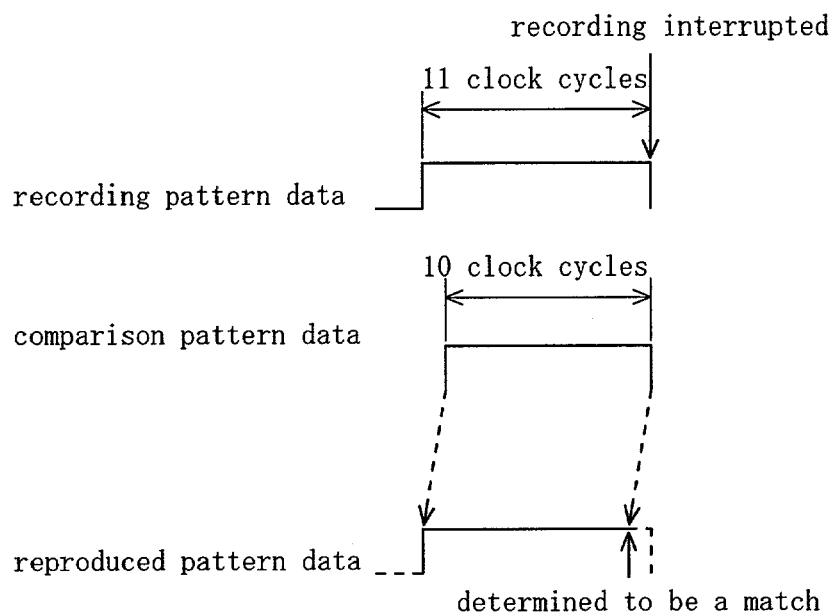
FIGS. 11A and 11B show variations of the embodiments.
Figure 11B:
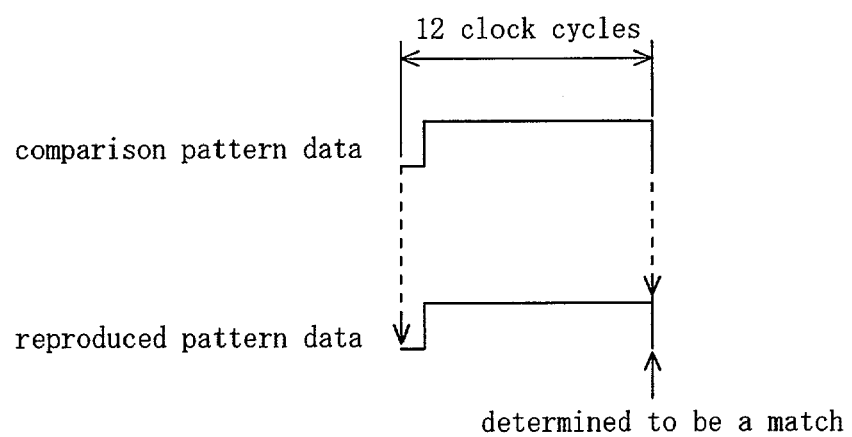
Figure 12A:
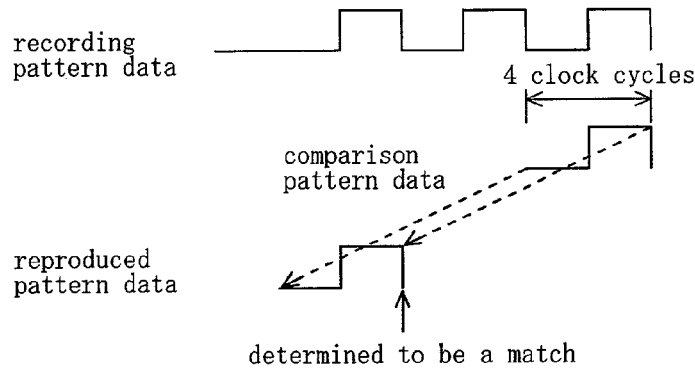
FIGS. 12A, 12B, and 12C show other variations of the embodiments.
Figure 12B:
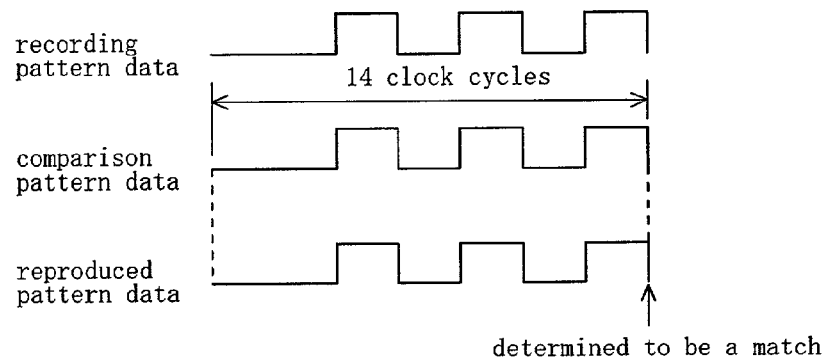
Figure 12C:
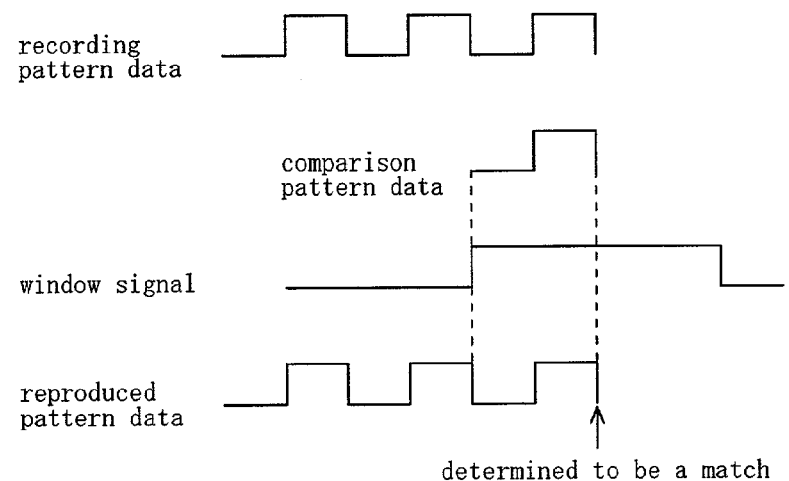

In addition, the bit length, minimum matching bit number, and window width of the comparison pattern data may be changed according to the content of the comparison pattern data. For example, as shown in FIG. 11A, when the pattern data to be recorded shows H level successively for 11 clock cycles, it is determined that a match has been obtained between the pattern data at the time when the reproduced pattern data shows H level for 10 successive clock cycles if the comparison pattern data held in the shift register 211 only contains data for 10 clock cycles. If this is the case, a comparison pattern data for 12 clock cycles can be used to accurately determine the location of interruption of recording, as shown in FIG. 11B. Moreover, as shown in FIG. 12A, when the same pattern appears successively, there is a possibility that it is determined that a match has been obtained between the pattern data even at a different location from the location of interruption of recording. If this is the case, the comparison pattern data should be made longer than the successive pattern or the window width should be narrowed, as shown in FIGS. 12B and 12C, in order to accurately determine the location of interruption of the recording.

The above examples show the range in which a match between pattern data is to be detected (i.e., the window) is set with reference to a subcode sync, but the invention is not limited thereto, and EFM frame sync or the like may be used instead.

The above-described embodiments have described examples for CD-R recording devices, but the invention is not limited thereto and is applicable to any similar data recording devices that require the control of the interruption and restart of recording. According to recording formats adopted in the applicable devices, similar operations may be employed.

As has been described above, the location at which recording is to be restarted is detected by comparing pattern data. Thus, according to the present invention, even if a data reproduction error occurs due to a scratch or the like on an optical disk at the time when recording of data is interrupted, the location at which data is recorded last can be accurately detected, enabling restart of recording in a seamless manner.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A controller for a data recording device wherein, if recording to a recording medium is temporarily interrupted, then the recording is restarted in continuation of the end of recorded data that have been recorded prior to the interruption of the recording, comprising:
a data match-detecting means for detecting a match between at least part of pre-recording data that are used for the recording prior to the interruption of the recording and reproduced data that are reproduced subsequent to the interruption of the recording; and
an end-of-data-detecting means for detecting the end of the recorded data according to the detection of the match carried out by the data match-detecting means within the range of a predetermined number of clock cycles counted from a predetermined reference location in the reproduced data,
wherein the data match-detecting means compares data having a predetermined number of bits of the pre-recording data that are before the end of the pre-recording data with data having the same number of bits of the reproduced data, and the data match-detecting means determines that a match between the data has been detected if the number of matching bits is equal to or greater than a predetermined threshold value.

2. The controller for a data recording device according to claim 1, wherein the threshold value is variable.

3. The controller for a data recording device according to claim 2, wherein the threshold value is set according to a quality of a reproduced signal when reproducing the reproduced data.

4. The controller for a data recording device according to claim 3, wherein the quality of the reproduced signal is determined by the presence or absence of a synchronizing signal in the reproduction signal.

5. The controller for a data recording device according to claim 1, wherein the range of the predetermined number of clock cycles is variable.

6. The controller for a data recording device according to claim 5, wherein the range of the predetermined number of clock cycles is set according to a quality of a reproduced signal when reproducing the reproduced data.

7. The controller for a data recording device according to claim 6, wherein the quality of the reproduced signal is determined by the presence or absence of a synchronizing signal in the reproduction signal.

8. The controller for a data recording device according to claim 1, further comprising an interruption timing-controlling means for controlling timing of interrupting the recording from the time when a synchronization pattern has been recorded in the recording medium.

9. The controller for a data recording device according to claim 1, further comprising a recording speed-controlling means for controlling a recording speed such that the recording is restarted at a recording speed that is slower than the speed of the recording before the interruption of the recording and the recording speed is thereafter returned to the speed of the recording before the interruption of the recording.

10. A data recording device wherein, if recording to a recording medium is temporarily interrupted, then the recording is restarted in continuation of the end of recorded data that have been recorded prior to the interruption of the recording, comprising:

- a recording data-generating means for generating recording data;
- a recording means for recording the generated data in the recording medium;
- a data match-detecting means for detecting a match between at least part of pre-recording data that are used for the recording prior to the interruption of the recording and reproduced data that are reproduced subsequent to the interruption of the recording;
- an end-of-data-detecting means for detecting the end of the recorded data according to the detection of the match carried out by the data match-detecting means within the range of a predetermined number of clock cycles counted from a predetermined reference location in the reproduced data; and
- a recording restart-controlling means for restarting data recording by operating the recording data-generating means and the recording means when the end of the recorded data is detected by the end-of-data-detecting means, wherein the data match-detecting means compares data having a predetermined number of bits of the pre-recording data that are before the end of the pre-recording data with data having the same number of bits of the reproduced data, and the data match-detecting means determines that a match between the data has been detected if the number of matching bits is equal to or greater than a predetermined threshold value.

11. The data recording device according to claim 10, further comprising a recording speed-controlling means for controlling a recording speed such that the recording is restarted at a recording speed that is slower than the speed of the recording before the interruption of the recording and the recording speed is thereafter returned to the speed of the recording before the interruption of the recording, wherein the recording speed-controlling means is configured to control the recording speed by controlling operation speeds of the recoding data-generating means and the recording means.

* * * * *